United States Patent [19]

Haimberger et al.

[11] Patent Number: 5,713,456
[45] Date of Patent: Feb. 3, 1998

[54] BULK PRODUCT STABILIZING BELT CONVEYOR

[75] Inventors: Hans Haimberger, Milton-Freewater, Oreg.; Rodolfo Sanchez, College Place, Wash.

[73] Assignee: Key Technology, Inc., Walla Walla, Wash.

[21] Appl. No.: 685,351

[22] Filed: Jul. 23, 1996

Related U.S. Application Data

[63] Continuation of Ser. No. 426,893, Apr. 20, 1995, abandoned.

[51] Int. Cl.$^6$ .................................................. B65G 15/30
[52] U.S. Cl. .................................................. 198/638; 198/641
[58] Field of Search .................. 198/638, 810.04, 198/810.01, 813, 835; 209/587, 577, 939, 922, 923

[56] References Cited

U.S. PATENT DOCUMENTS

| Re. 33,357 | 9/1990 | Randall | 358/106 |
|---|---|---|---|
| 672,358 | 4/1901 | Dodge | 198/638 |
| 2,081,182 | 5/1937 | Malke et al. | 209/120 |
| 2,852,126 | 9/1958 | Ohlberg | 198/638 X |
| 3,191,756 | 6/1965 | Paurat | 198/128 |
| 4,624,367 | 11/1986 | Shafer et al. | 209/577 |
| 4,830,180 | 5/1989 | Ferguson et al. | 198/836 |
| 4,909,930 | 3/1990 | Cole | 209/564 |
| 5,048,674 | 9/1991 | Wilbur et al. | 198/836.2 |
| 5,273,166 | 12/1993 | Sawamura | 209/537 |

FOREIGN PATENT DOCUMENTS

| 511814 | 6/1952 | Belgium | 198/641 |
|---|---|---|---|
| 1031106 | 6/1953 | France. | |
| 1028492 | 4/1958 | Germany. | |
| 1070548 | 12/1959 | Germany. | |
| 1280787 | 10/1968 | Germany. | |
| 360237 | 6/1938 | Italy. | |
| 1708717 | 1/1992 | U.S.S.R.. | |

*Primary Examiner*—Frank E. Werner
*Attorney, Agent, or Firm*—Wells, St. John, Roberts, Gregory & Matkin, P.S.

[57] ABSTRACT

A bulk product stabilization conveyor 10 is described having a continuous-length wide belt 30 extending in an upper flight 44 and in a lower flight 46 between an infeed end 32 and an outfeed end 34. The outfeed end 34 is elevationally below the infeed end 32 and the distance between the infeed end 32 and outfeed end 34 is such that the upper flight 44 is slack with the upper flight forming a dynamic catenary profile as it is being driven at a high velocity in excess of 400 feet per minute and preferably between 400-800 feet per minute. The upper flight 44 has an inclined downward and forward section 52 adjacent the infeed end that has an inclination of between 30 and 45 degrees to initially receive a wide swath of articles from an article feeder 14. The upper flight 44 has an intermediate section 54 with a progressively decreasing radius of curvatures to progressively apply an increasing centrifugal force on the articles to stabilize the articles on the high velocity upper flight. The upper flight 44 has an inclined upward section 56 adjacent the outfeed end 34 to propel the articles from the outfeed end to an optical inspection station 36 with an upward and forward trajectory 68.

30 Claims, 1 Drawing Sheet

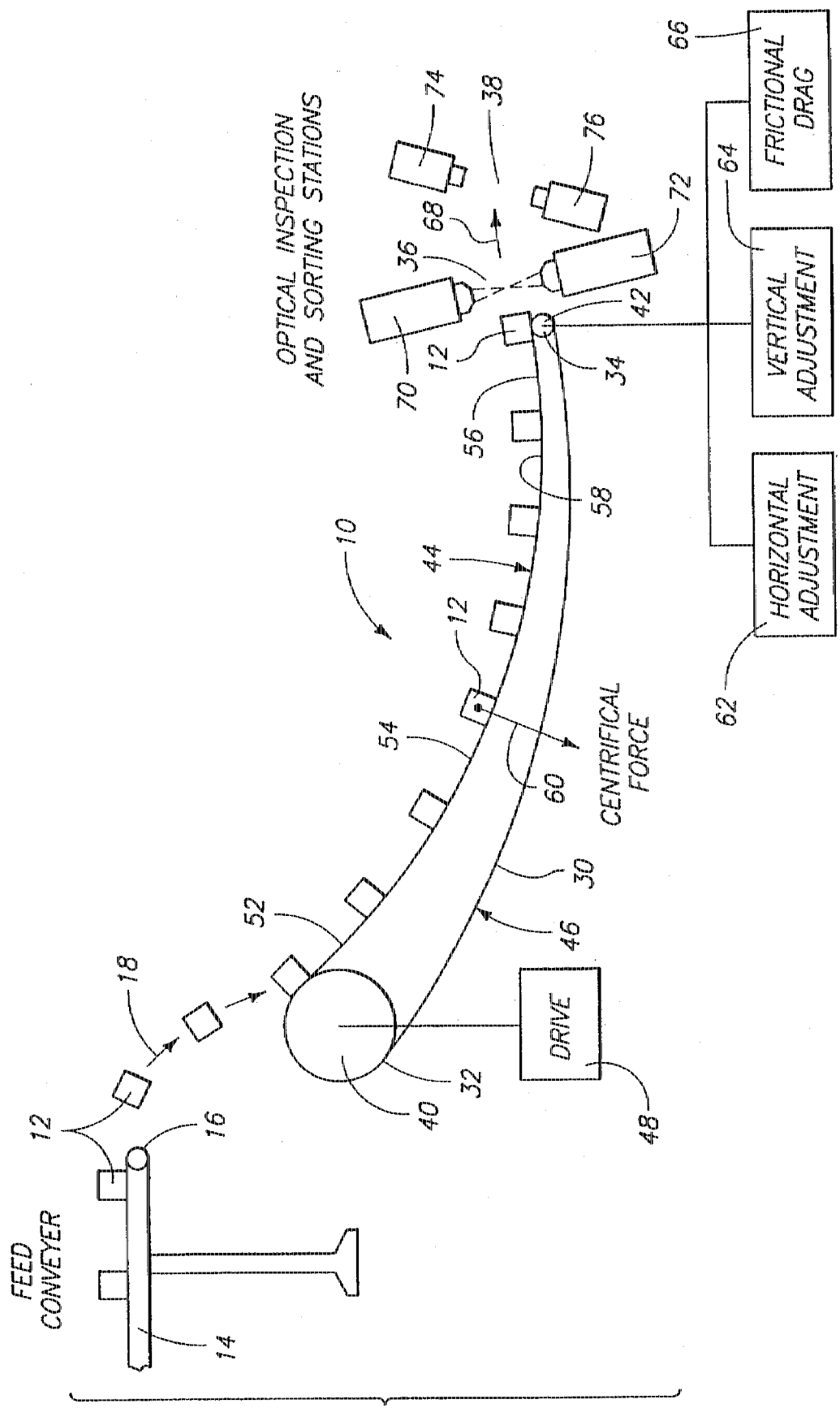

BULK PRODUCT STABILIZING BELT CONVEYOR

RELATED PATENT DATA

The present application is a continuation application of application Ser. No. 08/426,893, filed Apr. 20, 1995 now abandoned.

TECHNICAL FIELD

This invention relates to continuous-length high speed belt conveyors for conveying bulk products or articles and particularly those belt conveyors having features for stabilizing the articles on the conveyor to prevent the articles from moving relative to the belt as the articles are being presented to optical inspection equipment for determining optical properties of the articles, such as blemishes and other imperfections.

BACKGROUND OF THE INVENTION

Over the years, optical inspection equipment has been devised to automatically optically inspect each article in a mass of articles passing an inspection station. One such very effective system is described in U.S. Pat. No. 4,581,632 granted in 1986 (reissued on Sep. 25, 1990 as RE Pat. No. 33,357). In such systems, it is not uncommon to utilize high speed conveyor belts of up to seventy-two inches in width to convey a wide swath of the articles past such automatic optical inspection equipment. To obtain the optimum benefits of high speed optical equipment and to increase the effectiveness and accuracy of the inspection, it is highly desirable to maintain each article relatively stationary with respect to adjacent articles, even though the articles are moving in mass at high velocities. Such an "article stabilized condition", is particularly important, if not mandatory, when high speed sorting equipment is associated with the optical inspection equipment to sort the articles based on the results of the optical inspection, such as optically recognizable defects. It is important that each article maintain its relative position during the inspection and sorting process.

The problem becomes quite difficult when the articles are dropped onto the infeed end of a high speed conveyor at a relatively slow forward velocity from a shaker feeder that is designed to evenly distribute the articles laterally and longitudinally and then propel the articles from the feeder in a wide swath. When articles to be inspected exit a feeder and drop onto a high speed conveyor, the articles, because of the large difference between their velocity and the velocity of the conveyor, tend to bounce and slide or roll longitudinally as well as transversely relative to the conveyor and relative to each other. Several solutions to the problem have been suggested in the W. Sheldon Ferguson et al. U.S. Pat. No. 4,830,180 granted May 16, 1989 and the John H. Wilbur et al U.S. Pat. No. 5,048,674 granted Sep. 17, 1991. Both patents describe roller mechanisms overlying the high speed conveyor that are rotating at about the same tangential speed of the conveyor to bias the articles into firm contact with the conveyor to quickly "stabilize" the articles on the high speed conveyor.

Although such roller stabilizers have been reasonably successful, they have to be adjusted and cleaned frequently. Also it is not uncommon for the articles to stick to the rollers causing injury to the articles and providing irregular results.

One of the objectives and advantages of this invention is to greatly simplify the stabilization process without having to engage the articles to force the articles to become stationary on the high speed belt.

An additional objective and advantage of this invention is to provide a unique high speed conveyor that incorporates within itself the ability to stabilize the articles even though the articles are being fed to the high speed conveyor by slow speed feeders such as shaker feeders.

A further object and advantage of this invention is to provide a unique high speed conveyor that minimizes damage or spillage of the articles, particularly fragile vegetables, -even though the articles are accelerated from a low speed to a high speed very rapidly.

These and other objects and advantages of this invention will become apparent upon careful consideration of a description of a preferred embodiment as set forth in the following sections including the claims.

BRIEF DESCRIPTION OF THE DRAWINGS

A preferred embodiment of the invention is described below with reference to the accompanying schematic side view drawing of a high speed continuous length belt conveyor that receives bulk products from a shaker feeder and stabilizes the articles on the conveyor and conveys the articles in their stabilized condition at high speeds to an optical inspection and sorting station.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

A preferred embodiment of a bulk product stabilizing belt conveyor is illustrated in the drawing and is generally designated with the numeral 10. The conveyor 10 is designed to (1) receive bulk articles 12 fed in a wide swath from a low velocity bulk feeder 14, such as a feed shaker; (2) stabilize the articles on the belt conveyor; and (3) convey the articles at a high velocity individually past an optical inspection station 36 and possibly a sorting station 38.

The articles may be all manner of products including agricultural products such as beans, peas and corn or man made objects which may have uniform or irregular shapes. For ease of illustration, the articles 12 are depicted in the drawings as squares.

The bulk feeder 14, such as a feed shaker, generally spreads the articles out both laterally and longitudinally into a single layer having a wide swath. The bulk feeder 14 has a discharge end 16 that discharges the articles in a wide swath from the feeder 14 into free flight toward the conveyor 10 at a low horizontal velocity of 200 feet per minute or less. The free flight trajectory of the articles 12 discharged from the feeder 14 is designated with the numeral 18.

The conveyor 10 has a wide continuous-length belt 30. Preferably, the belt 30 varies in width from twelve inches to seventy-four inches to receive the wide swath of articles discharged from the feeder 14. The belt 30 extends between an infeed or intake end adjacent the discharge end 16 of the feeder 14 and an outfeed or exhaust end 34 adjacent the optical inspection station 36. The belt 30 is supported on a drive roller 40 at the infeed end 32 and an idler roller or nose bar 42 at the outfeed end 34 that define a belt upper flight 44 and a return lower flight 46 extending therebetween.

The belt 30 is driven at a high velocity, greater than 400 feet per minute, by a drive 48 attached to the drive roller 40. Preferably, the upper flight 44 is driven at a belt speed of between 400 and 800 feet per minute. It is preferable that the belt 30 is driven from the drive roller 40 at the infeed end 32 rather than from the outfeed end 34.

Importantly, the outfeed end 34 is positioned at an elevation below that of the infeed end 32 and is positioned sufficiently close to the infeed end 32 to generate slack in the upper flight 44 to cause the upper flight to droop in a general catenary profile between the infeed end 32 and the outfeed end 34 as illustrated in the drawing. The precise profile of the upper flight will be modified by the centrifugal force that is exerted on the upper flight as it passes at a high velocity between the infeed end 32 and the outfeed end. For purposes of description, such modified profile will be referred to as "dynamic catenary profile".

More specifically, the upper flight 44 has an article receiving section 52 adjacent the infeed end 32 that extends downward and forward, a curved intermediate section 54, and an inclined upward section 56 that extends inclined upward and forward adjacent the outfeed end 34. Preferably the article receiving section 52 is inclined downward and forward at an angle of between 30 and 45 degrees from horizontal for initially receiving the articles to minimize article turbulence such as bouncing, tumbling and rolling on the belt. The curved intermediate section 54 has a progressively decreasing radius of curvature to progressively increase centrifugal forces applied to the articles to cause the articles to remain stationary or stabilized on the belt and not to move relative to the adjacent articles as the articles are conveyed to the outfeed end 34. The upper flight 44 has a trough portion 58 that is elevationally below that of the outfeed end 34. The inclined upward section 56 extends upward and forward at a rather shallow angle to provide a small upward velocity vector on the articles 12 to assist in the separation and gentle transfer of the stabilized articles 12 as the articles are propelled into free flight past the optical inspection station 36 and the sorting station 38.

To adjust the relative positions of the infeed end 32 and the outfeed end 34, horizontal adjustments 62 and vertical adjustments 64 are connected to at least the outfeed end. Such adjustments enable the operator to adjust the contour, particularly the radii of curvatures of the upper flight, to accommodate various products, speed, product volume and other variables. Additionally, a torque control mechanism 66 may be attached to the idler roller 42 to control the tension and slack on the upper and lower belt flights 44, 46.

Additionally, the conveyor 10 is positioned relative to the discharge end 16 of the feeder 14 or relative to the trajectory 18 of the articles 12 so that the angle of the receiving section 52 more closely coincides with the trajectory angle of the articles. Such a feature minimizes bouncing and article turbulence upon initial contact of the articles on the upper flight 44 of the conveyor 10.

Further, the infeed end 32 of the conveyor 10 is positioned sufficiently below and underneath the discharge end 16 so that the articles 12 in free flight in the trajectory 18 are given sufficient time to accelerate by gravity to a velocity that more nearly approximates the velocity of the upper flight 44. It is desirable for the infeed end 32 to be elevated sufficiently below the discharge 16 so that the articles are given an opportunity to accelerate during free flight by the forces of gravity to velocities greater than three-quarters that of the velocity of the upper flight before engaging the inclined section 52. Such a feature appears to significantly reduce the initial article turbulence on the belt.

The above features provide a rather inexpensive conveyor that is able to quickly and efficiently stabilize the articles on the conveyor while being able to transport the articles at very high volumes and speeds to the optical inspection and sorting stations. It is anticipated that such a conveyor 10 will be able to provide for accurate sorting of between 6,000 and 60,000 lbs. per hour depending upon the product.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. A continuous-length belt conveyor for stabilizing a wide swath of articles on the conveyor and conveying the stabilized articles along the conveyor comprising:
    a continuous-length belt extending between an intake end and an exhaust end and having an upper belt flight for (1) initially receiving the articles in a wide swath from an article feeder adjacent the intake end, (2) stabilizing the articles on the upper flight between the intake end and the exhaust end, and (3) launching the stabilized articles from the upper belt flight at the exhaust end;
    a belt drive operatively connected to at least one of the ends of continuous-length belt conveyor for moving the upper flight at a given velocity between the intake end and the exhaust end; and
    wherein the intake end and exhaust end of the continuous-length belt conveyor are positioned with the exhaust end being at a lower elevation than the intake end, and wherein the exhaust end and intake end are sufficiently close together to provide a sufficient slack in the upper flight to cause the upper flight to curve downwardly and forwardly between the intake end and the exhaust end to generate sufficient centrifugal forces on the articles to stabilize the articles on the upper flight and prevent the wide swath of articles from moving relative to each other.

2. The continuous-length conveyor as defined in claim 1 wherein the slack upper flight of the belt has a trough section that is elevationally lower than the upper flight at the exhaust end.

3. The continuous-length conveyor as defined in claim 1 wherein the upper flight has a section adjacent the intake end that has a slope of between 30 and 45 degrees for initially receiving the articles on the upper flight.

4. The continuous-length conveyor as defined in claim 1 wherein the upper flight has a curved intermediate section between the intake end and the exhaust end and which has a progressively decreasing radius of curvature as the intermediate section extends toward the exhaust end.

5. The continuous-length conveyor as defined in claim 1 wherein the upper flight is essentially unsupported between the intake end and the exhaust end and which forms a dynamic catenary profile therebetween with a section of the upper flight at a lower elevation than a section at the exhaust end.

6. The continuous-length conveyor as defined in claim 1 wherein the upper flight of the belt is driven at the given velocity from the intake end.

7. The continuous-length conveyor as defined in claim 1 wherein the upper flight of the belt has an upward inclined section adjacent the exhaust end to propel the articles from the exhaust end with an initial vertical velocity component to facilitate the separation of the stabilized articles from the upper flight.

8. The continuous-length conveyor as defined in claim 1 wherein the articles are ejected onto the upper flight at a location adjacent the intake end with a forward and downward trajectory, and wherein the upper flight has a receiving section adjacent the intake end that is inclined downward and forward for initially receiving the ejected articles.

9. The continuous-length conveyor as defined in claim 8 and wherein the articles are initially ejected toward the upper flight at a prescribed feed elevation and with a horizontal velocity less than one-half of the given velocity of the upper flight, and wherein the intake end is positioned relative to the prescribed feed elevation a distance sufficient to permit the articles to accelerate in free flight, under the influence of gravity, to a velocity greater than three-quarters that of the given velocity of the upper flight prior to engaging the inclined receiving section of the upper flight.

10. The continuous-length conveyor as defined in claim 9 wherein the receiving section of the upper flight is inclined at an angle of substantially about 30 to about 45 degrees.

11. A continuous-length belt conveyor for (1) receiving a wide swath of articles fed to the conveyor in free flight from an article feeder at a predetermined velocity, (2) stabilizing the wide swath of articles on the continuous length conveyor, and (3) conveying the stabilized articles along the conveyor at a given velocity, comprising:

a continuous-length belt extending between an intake end and an exhaust end and having an upper belt flight for (1) initially receiving the articles in a wide swath from an article feeder adjacent the intake end; (2) stabilizing the articles on the upper flight between the intake end and the exhaust end by centrifugal force, and (3) launching the stabilized articles from the upper belt flight at the exhaust end;

a belt drive operatively connected to at least one of the continuous length belt conveyor ends to move the upper flight at a given velocity greater than twice the predetermined velocity of the articles fed from the article feeder;

wherein the upper flight has a receiving section adjacent the intake end that is inclined downward and forward for initially receiving the ejected articles from the article feeder; and wherein the intake end is positioned relative to the article feeder a distance sufficient to permit the articles to accelerate in free flight by the influence of gravity to a velocity sufficient to engage the inclined receiving section of the upper flight with minimum article turbulence.

12. The continuous-length conveyor as defined in claim 11 wherein the intake end and exhaust end of the belt conveyor are positioned with the exhaust end being at a lower elevation than the intake end and wherein the exhaust end and intake end are sufficiently close together to provide sufficient slack in the upper flight to cause the upper flight to curve downwardly and forwardly between the intake end and the exhaust end to generate sufficient centrifugal forces on the articles to stabilize the articles on the upper flight and prevent the wide swath of articles from moving relative to each other.

13. The continuous-length conveyor as defined in claim 12 wherein the slack upper flight of the belt has a trough section that is elevationally lower than the upper flight at the exhaust end.

14. The continuous-length conveyor as defined in claim 12 wherein the inclined downward section of the upper flight has a slope of substantially about 30 to about 45 degrees for initially receiving the articles on the upper flight.

15. The continuous-length conveyor as defined in claim 12 wherein the upper flight has an intermediate section between the intake end and the exhaust end and which has a progressively decreasing radius of curvature as the intermediate section extends toward the exhaust end.

16. The continuous-length conveyor as defined in claim 12 wherein the upper flight is substantially unsupported between the intake end and the exhaust end thereby forming a dynamic catenary profile therebetween with a section of the upper flight at a lower elevation than a section at the exhaust end.

17. The continuous-length conveyor as defined in claim 12 wherein the upper flight of the belt is driven at the given velocity from the intake end.

18. The continuous-length conveyor as defined in claim 12 wherein the upper flight of the belt has an upward inclined section adjacent the exhaust end to propel the articles from the exhaust end with an initial vertical velocity component to facilitate the separation of the stabilized articles from the upper flight.

19. A continuous-length belt conveyor for receiving, stabilizing and conveying articles along the conveyor at a given speed to an article inspection and sorting station, comprising:

a continuous-length belt extending between an intake end adjacent the article feeder and an exhaust end adjacent the inspection and sorting station;

said belt having an upper belt flight for (1) initially receiving the articles in a wide swath from the article feeder adjacent the intake end, (2) stabilizing the articles on the upper flight between the intake end and the exhaust end, and (3) launching the stabilized articles from the upper belt flight at the exhaust end in a free flight path in the direction of the inspection and sorting station;

a belt drive operatively connected to at least one of the ends of the continuous-length belt for moving the upper flight at a given velocity between the intake end and the exhaust end; and wherein the intake end and exhaust end of the belt conveyor are positioned with the exhaust end being at a lower elevation than the intake end and wherein the exhaust end and intake end are sufficiently close together to provide sufficient slack in the upper flight to cause the upper flight to curve downwardly and forwardly between the intake end and the exhaust end to generate sufficient centrifugal forces on the articles to stabilize the articles on the upper flight and to prevent the wide swath of articles from moving relative to each other while traveling in free flight to the inspection and sorting station.

20. The continuous-length conveyor as defined in claim 19 wherein the upper flight of the belt has an upward inclined section adjacent the exhaust end to propel the articles in free flight from the exhaust end with an initial vertical velocity component to facilitate the separation of the stabilized articles from the upper flight.

21. A continuous belt conveyor for transporting a plurality of articles, comprising:

a continuous belt extending between an intake end and an exhaust end, the continuous belt having an upper flight for supporting a plurality of articles for movement from the intake to the exhaust end, and wherein the exhaust end is positioned at a lower elevation relative to the intake end, and wherein the intake and exhaust ends are positioned sufficiently close together to cause the upper flight to curve downwardly and forwardly between the intake and exhaust ends; and a drive assembly disposed in driving relation relative to at least one of the ends of the continuous belt for moving the upper flight at a given velocity between the intake and exhaust ends, and wherein the velocity of the upper flight is effective to generate centrifugal force on the plurality of articles to substantially stabilize the articles on the upper flight as they move between the intake and the exhaust ends.

22. A continuous belt conveyor as claimed in claim 21, wherein an article feeder is positioned in feeding relation relative to the intake end of the continuous belt, and wherein the upper flight initially receives the articles in a wide swath from the article feeder.

23. A continuous belt conveyor as claimed in claim 21, wherein an article sorting station is positioned downstream of the exhaust end of the continuous belt, and wherein the articles supported on the upper flight are launched from the upper flight in the direction of the article sorting station.

24. A continuous belt conveyor as claimed in claim 21, wherein the upper flight is substantially unsupported between the intake end and the exhaust end, the upper flight forming a dynamic catenary profile therebetween with a section of the upper flight being at a lower elevation than a section at the exhaust end.

25. A continuous belt conveyor as claimed in claim 21, wherein the upper flight has a section adjacent the intake end that has a slope of about 30 to about 45 degrees for initially receiving the articles on the upper flight.

26. A continuous belt conveyor as claimed in claim 21, wherein the upper flight has a curved intermediate section between the intake end and the exhaust end, the intermediate section having a progressively decreasing radius of curvature as the intermediate section extends toward the exhaust end.

27. A continuous belt conveyor as claimed in claim 21, wherein an article feeder is positioned in feeding relation relative to the intake end of the conveyor belt, and wherein the article feeder ejects articles onto the upper flight with a given trajectory and velocity, and wherein the articles when departing from the article feeder have a velocity of less than about one-half of the velocity of the upper flight.

28. A continuous belt conveyor as claimed in claim 21, wherein an article feeder is positioned at a predetermined feed elevation relative to the intake end of the conveyor belt, and is further operable to eject articles onto the upper flight with a given velocity and trajectory, and wherein the intake end of the conveyor belt is positioned a given distance from the article feeder such that the articles ejected from the article feeder accelerate, under the influence of gravity, to a velocity greater than about three-quarters of the given velocity of the upper flight prior to engaging the intake end of the continuous belt.

29. A continuous belt conveyor as claimed in claim 21, wherein the continuous belt has an upward inclined section adjacent the exhaust end and which is effective to propel the articles from the exhaust end with an initial velocity component to facilitate the separation of the articles from the upper flight.

30. A continuous belt conveyor for stabilizing a plurality of articles delivered thereto, the continuous belt conveyor comprising:

a continuous belt extending between an intake end, and an exhaust end, and having an upper belt flight for initially receiving the articles and stabilizing the articles, by means of centrifugal force, for movement between the intake and exhaust ends of the continuous belt, and launching the stabilized articles from the upper belt flight at the exhaust end thereof, and wherein the intake end and the exhaust end of the continuous belt are positioned with the exhaust end being at a lower elevation than the intake end, and wherein the exhaust end and the intake end are sufficiently close together to provide a sufficient slack in the upper flight to cause the upper flight to form a dynamic catenary profile, and wherein the upper flight has a trough section that is elevationally lower than the upper flight at the exhaust end, and wherein the upper flight has a receiving section adjacent the intake end that has a slope of between 30 to about 45 degrees for initially receiving the articles on the upper flight, and wherein the upper flight has a curved intermediate section which has a progressively decreasing radius of curvature as the intermediate section extends toward the exhaust end, and wherein the upper flight has an upward inclined section adjacent the exhaust end to propel the articles from the exhaust end with an initial vertical velocity component to facilitate the separation of the stabilized articles from the upper flight;

a belt drive operatively connected to at least one of the ends of the continuous conveyor for moving the upper flight at a given velocity between the intake end and the exhaust end, and wherein the given velocity imparts sufficient centrifugal force on the articles to stabilize the articles on the upper flight and substantially prevent the articles from moving relative to each other; and an article feeder positioned adjacent the intake end of the continuous conveyor and which delivers a stream of articles to the intake end thereof, and wherein the article feeder delivers the articles to the intake end of the continuous conveyor at a prescribed feed elevation and with a horizontal velocity which is less than one-half of the given velocity of the upper flight, and wherein the prescribed feed elevation permits the articles to accelerate in free-flight, under the influence of gravity, to a velocity which is greater than about seventy five percent of the given velocity of the upper flight prior to engaging the inclined receiving section of the upper flight.

\* \* \* \* \*